(12) United States Patent
Khe et al.

(10) Patent No.: US 10,501,324 B2
(45) Date of Patent: Dec. 10, 2019

(54) SYSTEMS, DEVICES, AND/OR METHODS FOR REACTIVE GRAPHENE AND ITS APPLICATIONS

(71) Applicant: HK INVENT CORPORATION, Ho Chi Minh (VN)

(72) Inventors: Nguyen Khe, Ho Chi Minh (VN); Vo Linh, Ho Chi Minh (VN); Nguyen Trinh, Ho Chi Minh (VN); Ngueyn Phu, Ho Chi Minh (VN); Dinh Khanh, Ho Chi Minh (VN)

(*) Notice: Subject to any disclaimer, the term of this patent is extended or adjusted under 35 U.S.C. 154(b) by 90 days.

(21) Appl. No.: 15/859,576

(22) Filed: Dec. 31, 2017

(65) Prior Publication Data
US 2019/0202701 A1    Jul. 4, 2019

(51) Int. Cl.
| | |
|---|---|
| *C01B 32/186* | (2017.01) |
| *C01B 32/194* | (2017.01) |
| *C01B 32/198* | (2017.01) |
| *C08L 7/00* | (2006.01) |
| *C08K 3/04* | (2006.01) |
| *B82Y 40/00* | (2011.01) |
| *B82Y 30/00* | (2011.01) |

(52) U.S. Cl.
CPC ............ *C01B 32/186* (2017.08); *B82Y 30/00* (2013.01); *B82Y 40/00* (2013.01); *C01B 32/194* (2017.08); *C01B 32/198* (2017.08); *C08K 3/042* (2017.05); *C08L 7/00* (2013.01); *C01B 2204/22* (2013.01); *C01B 2204/24* (2013.01); *C01B 2204/26* (2013.01); *C01P 2004/24* (2013.01)

(58) Field of Classification Search
CPC ... C01B 32/186; C01B 32/194; C01B 32/198; C08K 3/042; B82Y 30/00; B82Y 40/00; C08L 7/00
USPC ......................................................... 524/495
See application file for complete search history.

(56) References Cited

U.S. PATENT DOCUMENTS 9,981,247 B2 * 5/2018 Chopra .................... B01J 21/18

* cited by examiner

*Primary Examiner* — Kelechi C Egwim
(74) *Attorney, Agent, or Firm* — Dale Jensen, PLC; Dale Jensen

(57) ABSTRACT

Certain exemplary embodiments can provide a system, which can comprise ink or a rubber object comprising reactive graphene. The reactive graphene comprises a graphene core that is chemically bonded with a reactive shell. The graphene core is a graphene hybrid composite comprising graphene and one or more of nanocarbon, graphene nanoplatelets, graphene oxide, reduced graphene oxide and/ or pristine graphene, etc.

18 Claims, 10 Drawing Sheets

FIG. 3

| REACTIVE GRAPHENE ID | Fe | S | Cl | Ca |
|---|---|---|---|---|
| G4_201518_67 | 69.10% | 19.10% | 7.52% | 1.30% |
| G4_201518_69 | 62.10% | 26.50% | 5.19% | 1.64% |
| G4_201518_73 | 56% | 29.20% | 5.02% | 6.01% |
| G4_201518_72 | 62.60% | 36.30% | 0.16% | 0.49% |
| G4_201518_78 | 24.80% | 37.90% | 23.20% | 8.98% |
| G4_201518_75 | 26.50% | 55.40% | 6% | 5.46% |
| G4_201518_80 | 30.70% | 65.70% | 1.73% | 0.90% |
| G4_201518_79 | 21.50% | 75.30% | 1.33% | 1.21% |

FIG. 7

| Nano carbon ID | | Manufacturer | Bulk resistivity(mΩ) | BET SSA(m2/g) |
|---|---|---|---|---|
| Reduced Graphene Oxide (RGO) | Powder | Graphenea | 800 | 500 |
| Vulcan XR72C carbon black | Powder | Cabot | 350 | 220 |
| BLACK PEARL carbon black | Powder | Cabot | 150 | 150 |
| Multi-walled carbon nano tube (MWNT) | Powder | Applied Technology | 80 | 135 |
| Multi-walled carbon nano tube (MWNT) | Powder | Arkema (French) | 46 | 165 |
| Reactive Graphene | Powder | Disclosed Embodiment | 12.4 | 1730 |
| Pristine graphene | Thin film | RG | 10 -12 | 500 |
| Copper powder | Powder | | 4-6 | N/A |

FIG. 10
(B) SSA=81m2/g
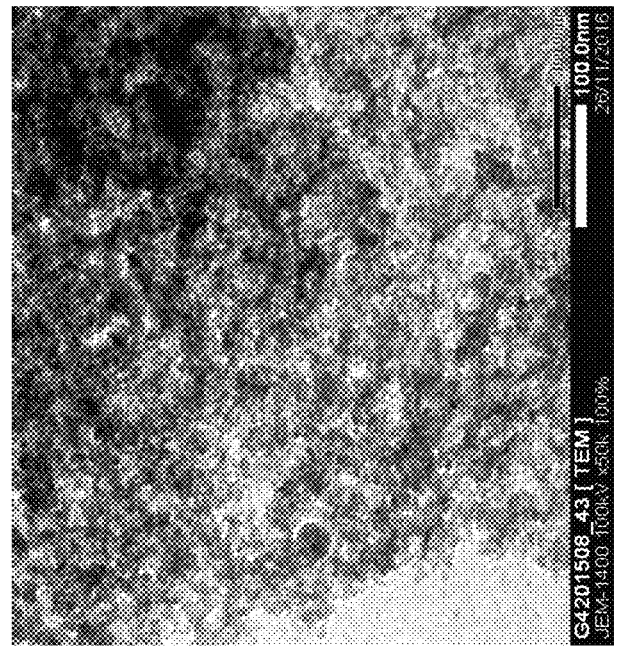
(A) SSA=1730m2/g

SYSTEMS, DEVICES, AND/OR METHODS FOR REACTIVE GRAPHENE AND ITS APPLICATIONS

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 3 is X-Ray Fluorescence spectroscopy ("XRF") data of an exemplary embodiment of RG showing the presence of reactive element sulfur;

FIG. 7 is summary data of bulk electrical resistivity and specific surface area of an exemplary embodiment of RG;

FIG. 10 is a transmission electron microscope ("TEM") image of an exemplary embodiment of EGHC having a different specific surface area ("SSA").

DETAILED DESCRIPTION

Figure 1:
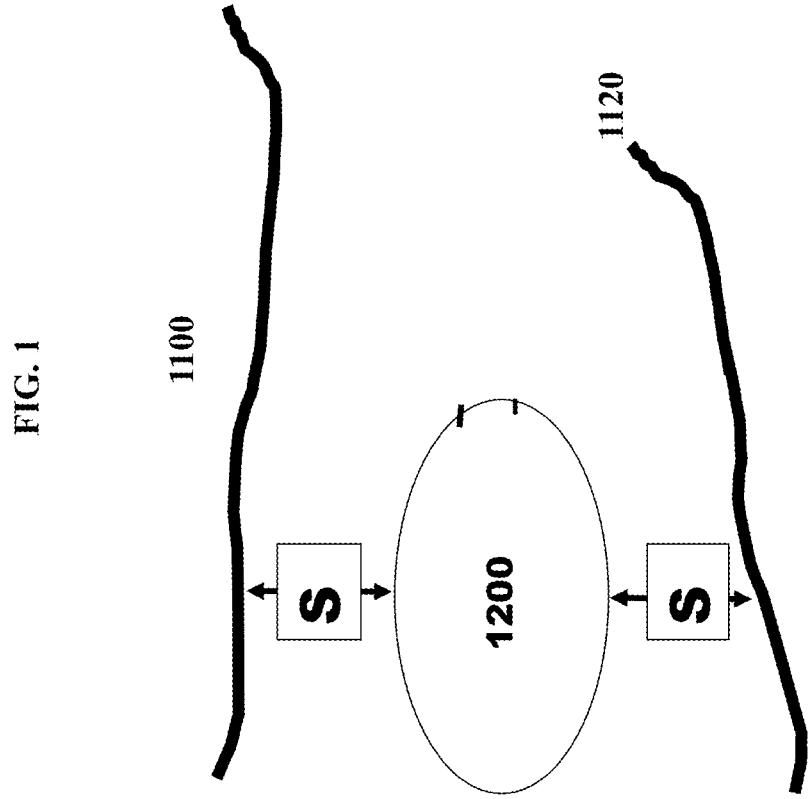
FIG. 1 is a crosslinking model of rubber with an exemplary embodiment of Reactive Graphene ("RG")
Figure 2:
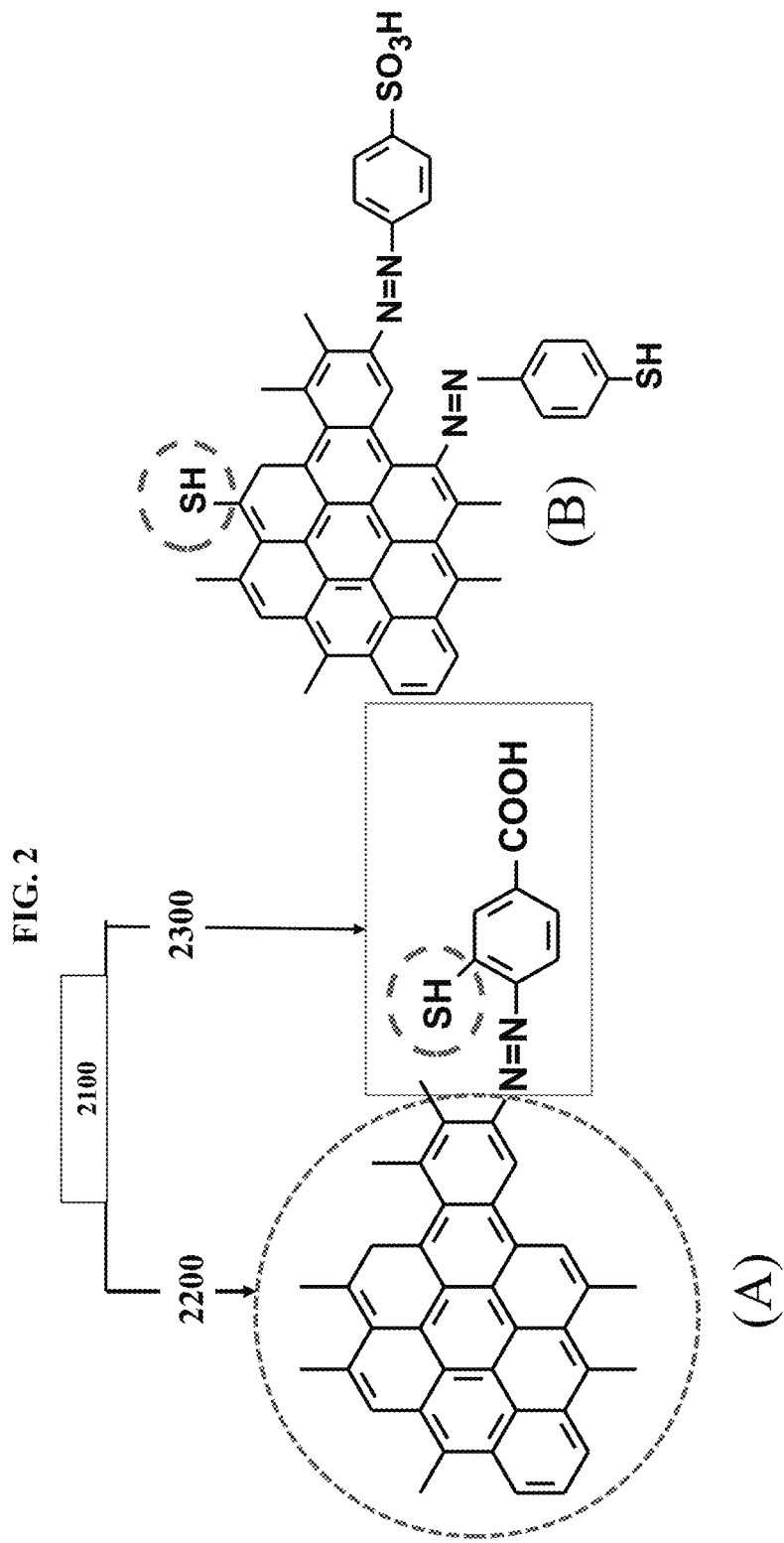
FIG. 2 is a chemical structure of an exemplary embodiment of RG.
Figure 4:
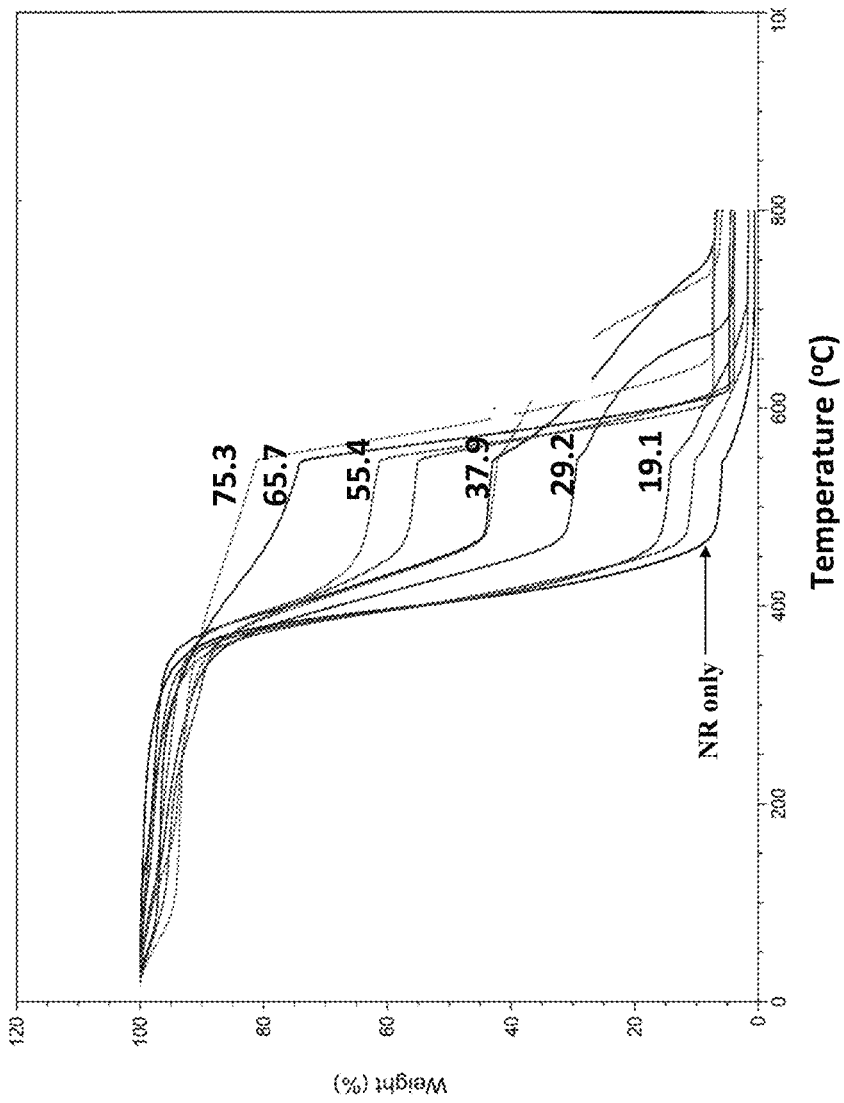
FIG. 4 is thermal gravimetric analysis ("TGA") data of an exemplary embodiment of a natural rubber/RG nano composite.
Figure 5:
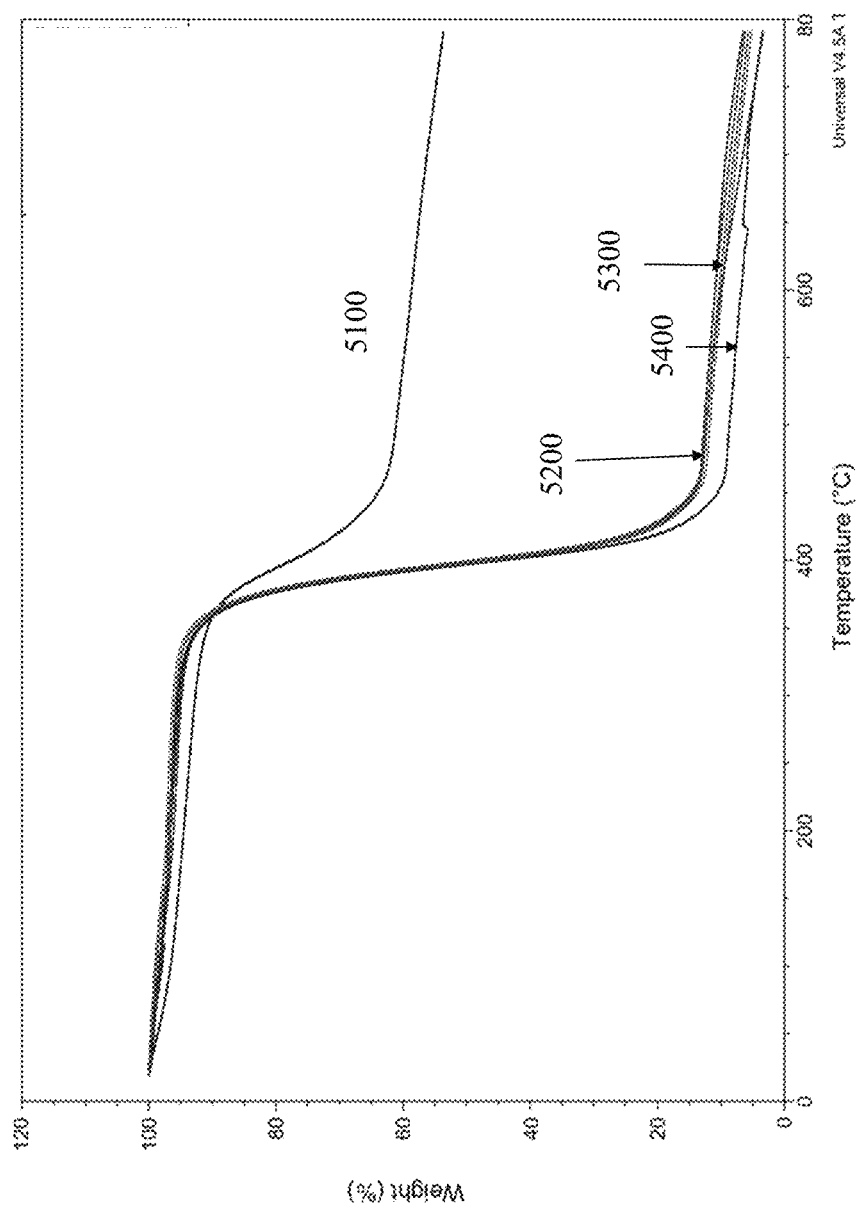
FIG. 5 is TGA data of an exemplary embodiment of a natural rubber/RG nano composite.
Figure 6:
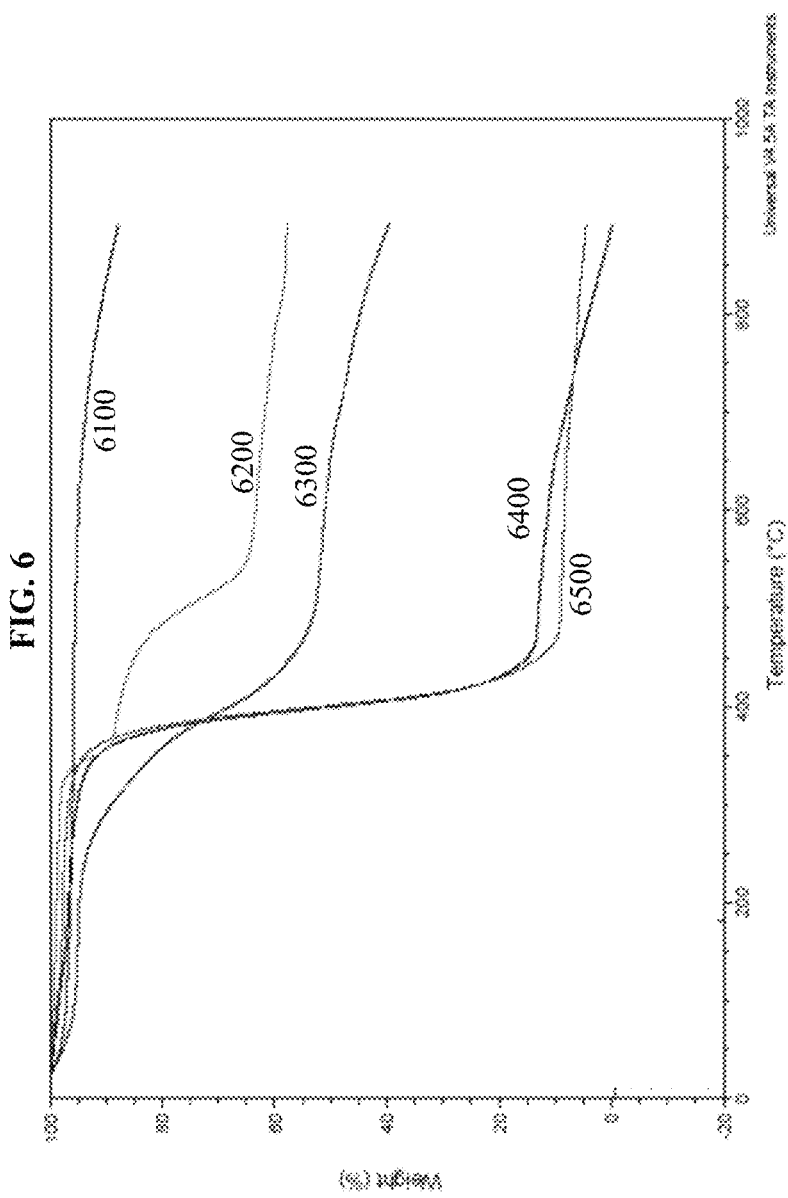
FIG. 6 is TGA data of an exemplary embodiment of a natural rubber/aerogel SC nanocomposite.
Figure 8:
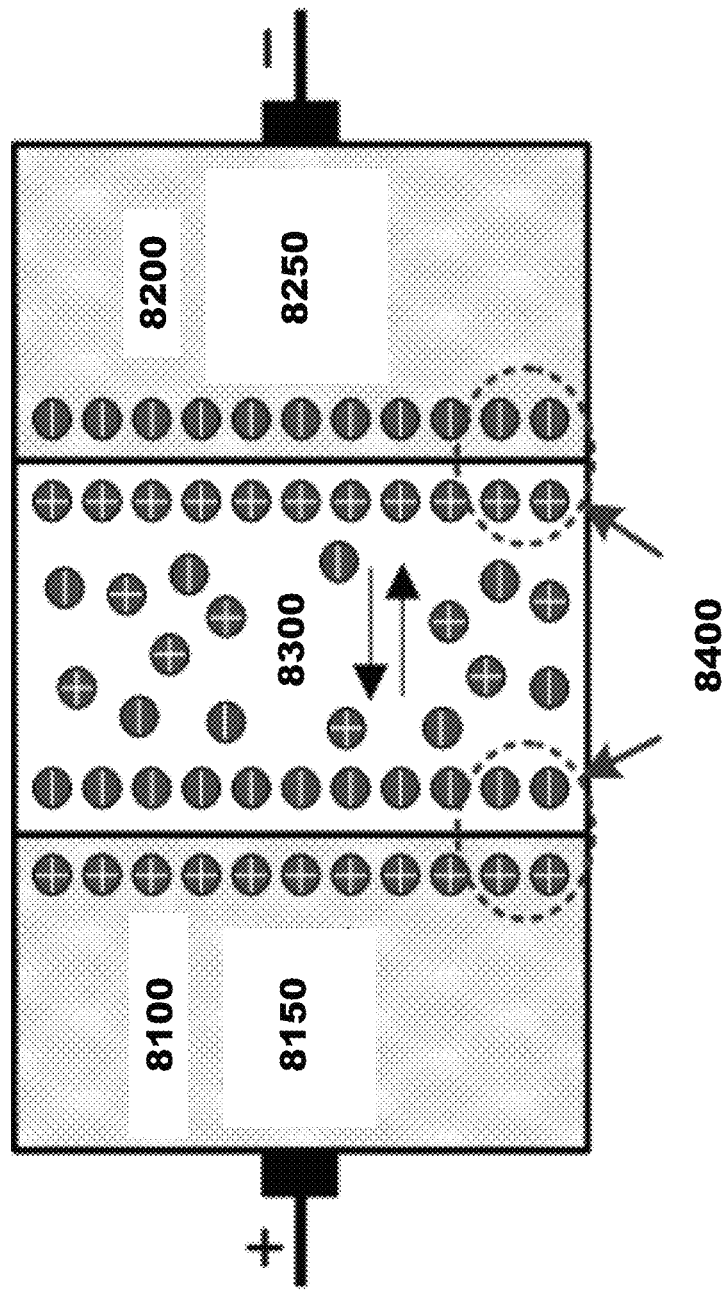
FIG. 8 is a structure of electric double layer capacitor ("EDLC") utilizing an exemplary embodiment of a RG.
Figure 9:
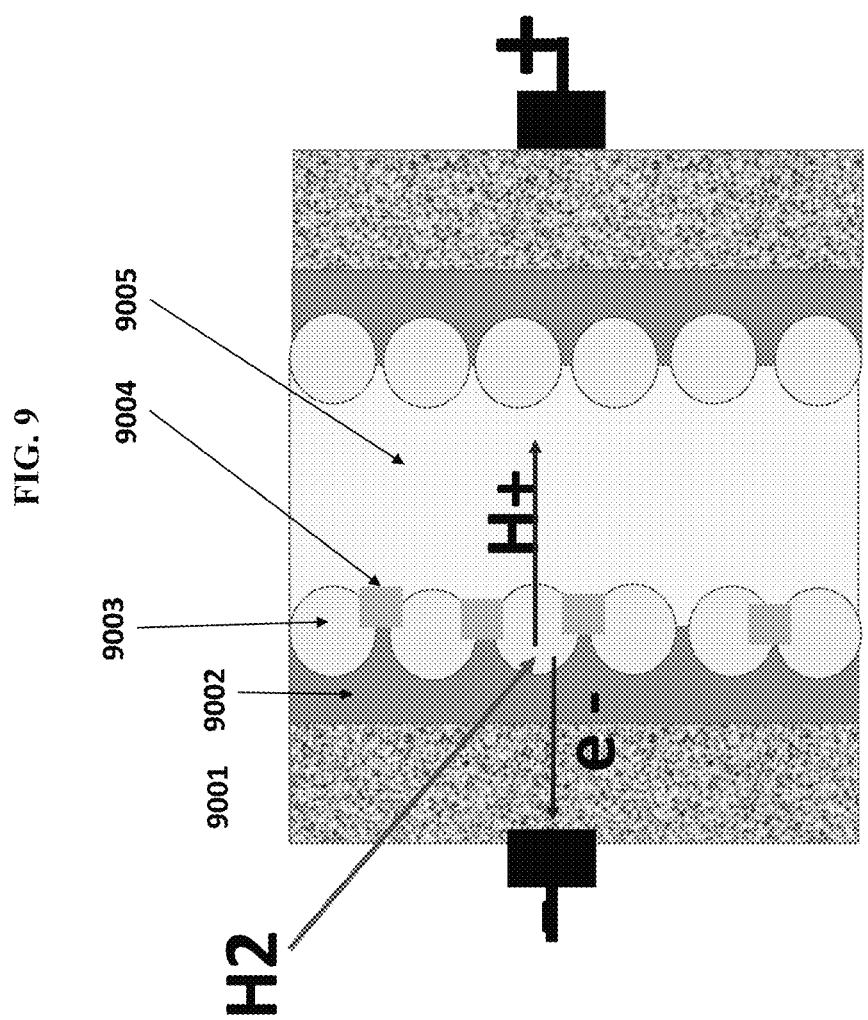
FIG. 9 is a structure of an exemplary hydrogen fuel cell utilizing an exemplary embodiment of am enhanced graphene hybrid composite ("EGHC") and RG.

Certain exemplary embodiments can provide a system, which can comprise ink or a rubber object comprising reactive graphene. The reactive graphene comprises a graphene core that is chemically bonded with a reactive shell. The graphene core is a graphene hybrid composite comprising graphene and one or more of nanocarbon, graphene nanoplatelets, graphene oxide, reduced graphene oxide and/or pristine graphene, etc.

Certain exemplary embodiments provide a universal nano filler comprising a silica/specific multifunctional organic acid ("SC") nanocomposite.

Recently, novel nanocarbon materials have received a lot of worldwide attention in the field of mechanical reinforcement due to superior hardness and toughness. Therefore, graphene can be an effective nanofiller to improve performance of such items as rubber tires. The successful development of graphitic nanofillers provides applications for graphene in the areas of rubber, plastics, ceramics, and/or metals etc.

Adding of nanocarbon materials into host media such as polymers via simple mixing did not show significant reinforcement effects due to the coagulation of the filler materials. Performance improvement can be limited due to blending failures, which can be caused by compatibility issues between graphene nanofillers and host rubber media.

Certain exemplary embodiments provide a new type of graphene, which can react with rubber via chemical bonding. Chemical bonding between graphene molecules and rubber can be improved due to increased reactivity with rubber. Such graphene is called RG herein.

Certain exemplary embodiments have several capabilities to resolve coagulation issues of graphene in rubber:
pristine graphene prepared in a thin film format is very inert and did not show significant reactivity with any media;
graphene oxide ("GO") is soluble in water but not reactive enough with rubber and did not show any significant rubber performance improvement;
reduced graphene oxide ("RGO") exhibits better reactivity with rubber than pristine graphene. However, the reactivity does not reach a practical level to show a significant performance improvement.

Each of these graphene categories can be relatively short in supply and/or relatively high in cost, which can restrain applications for consumable products such as tires.

Specific carbon black, such as N299 and/or N330, show greater reactivity than above cited types of nanocarbon. However, these carbon materials themselves are softer than graphene due to their multi-layer structure. They might utilize other subordinate fillers such as silica and/or organo-clays to enhance mechanical strength of rubber. A trade-off can be an increasing weight of components such as tires.

U.S. Pat. No. 9,460,827 disclosed a physical functionalization process utilizing solid-state carbon source ("CS") and solid-state metal catalyst ("MS") producing an exemplary GHC exhibiting tremendous flexibility in providing graphene with multi-functional groups. In addition, processes producing multi-functional groups on GHC without using relatively hazardous chemistry of Hummer process were also disclosed. GHC has promise for environmental friendliness and larger scale production capabilities.

U.S. patent application Ser. No. 15/437344 disclosed the nano-engraving technique of making Engraved Graphene ("EG") showing extraordinary large SSA, which is close to theoretical SSA of thin film graphene of approximately 2000 m2/g. Disclosed EG techniques provide suitable graphene products for dry compounding processes for rubber.

U.S. patent application Ser. No. 15/291860 disclosed the nano aerogel SC which helps to embed hydrophilic nano silica in molecular level of blending.

U.S. patent application Ser. No. 15/490842 disclosed the Water Soluble Engraved GHC ("WSEG") exhibiting significant compatibility with fresh NR latex Certain exemplary embodiments provide RG, which can chemically bonded into a polymer network of rubber to cause effective vulcanization and resulting performance improvement due to the increased reactivity. Generally speaking, the rubber vulcanization occurs using a sulfur cross-linker and/or sulfur compounds. However the curer of rubber with S compounds can be insufficient and one or more other additives can be added to accomplish desired properties.

In certain exemplary embodiments, vulcanization occurs via crosslinking effects using RG comprising a tough graphene core and a reactive shell. This graphene core can be chemically bonded onto a rubber polymer network under certain energy sources, especially, heat and/or sun light and can be a special cross linker for rubber.

The nanofiller effect of non-reactive nanocarbon is sometimes relatively weak and might not show as much of a practical performance improvement as desired because of a lack of chemical bonding and thus relatively poor reactivity with other substances (e.g., rubber) followed with strong coagulation.

Chemical bonding between nano filler and rubber tends to reduce coagulation, enhance nanofilling effects, and can lead to more effective mechanical reinforcement of the rubber.

An advantage of RG can be seen in an increased heat resistance.

In another exemplary of embodiment, a combined nanofiller effect has been observed when RG is used together with aerogel SC.

The RG molecules can be accomplished by adding species carrying reactive members into a GHC precursor, particularly, molecules comprising sulfur elements. The crosslinking model of rubber comprising RG carrying a sulfur element is schematically described in FIG. 1000.

FIG. 1000 is a crosslinking model of rubber with an exemplary embodiment of Reactive Graphene ("RG"). Natural rubber ("NR") elements 1100 and 1120 are shown crosslinked to RG 1200 via functional groups S.

Graphene precursors comprising an S element can be selected from:
CSs comprising S elements;
metal sources as catalysts comprising S elements; and/or
sulfur and/or sulfur compound additives, etc.

These chemical species provide a graphene core and/or a graphene shell carrying S element generated during a graphene forming step.

An introduction of reactive functional groups into GHC forming RG can be carried out by several different ways:
diazo coupling of GHC with S-element coupler, for example, 4-amino 3-mercaptobenzoic acid of which the RG having structure described in (A) of FIG. 2000;
precursors comprising S-elements as shown in (B) of FIG. 2000; and/or
catalyst MS comprising a reactive element, etc.

FIG. 2000 is a chemical structure of an exemplary embodiment of RG as illustrated on side (A), with a substance to be crosslinked to the RG shown on side (B). RG 2100 is illustrated as comprising graphene core 2200 and reactive shell 2300.

Certain exemplary embodiments provide a utilitarian substance comprising RG 2100. The utilitarian substance can comprise a natural rubber composite having a heat resistance of up to 550° C. RG 2100 comprises graphene core 2200 that is chemically bonded with reactive shell 2300. Wherein:
graphene core 2200 can be a graphene hybrid composite comprising graphene and one or more of nanocarbon, graphene nanoplatelets, graphene oxide, reduced graphene oxide and pristine graphene;
graphene core 2200 can be prepared via chemical vapor deposition utilizing at least one of a gas, liquid, and solid phase carbon sources; and
reactive shell 2300 carries reactive functional groups that are able to chemically react with other media, wherein the other media is a superconductor, conductor, semiconductor, or insulator, the reactive functional groups comprising electron donor molecules and electron acceptor molecules; wherein:
the electron acceptor molecules comprise one or more of chemical substituents carrying element S, thiols, sulfides, bisulfides, thiolanes, thiophenes, benzothiophenes, dibenzothiophenes, benzonapthothiophenes, Proxel GXL, triazine, —$NO_2$, —CN, carboxylic acid, sulfonic acid, ketone —CO, hydroxyl —OH, ether —O—, —$SO_2$, —$SOCl_2$, isothiocyanate, aldehyde, acyl azide, anhydride, carbodiimide, epoxide, fluorophenyl ester, carbonate, alkyl, phosphate, alcohol, halide, silanol-SiOH, siloxane, and —SiX, where X comprise one or more of $H_2$, alkyl, aryl, arylene, alkylene, alkoxides; and
electron donor molecules are selected from chemical substituents carrying amino-NR1R2 where R1 and R2 comprise one or more of $H_2$, alkyl, aryl, arylene, alkylene, and phosphorous.

The nano carbon can comprise carbon nanotubes, graphite, fullerene, and/or diamond, etc. The conductor can comprise one or more of a metal, organic charge transfer complex, conducting polymer, conducting ceramics, and/or electrolyte, etc.

The reactive graphene can induce rubber vulcanization in a rubber object. The reactive graphene can be utilized as a nanofiller to reinforce a polymer. The reaction between reactive graphene and other media can be chemical. The reaction between reactive graphene and other media can occur via heat, irradiation, or moisture. The reaction between reactive graphene and other media can occur via ultraviolet radiation, sunlight, X-Ray, gamma ray, microwave, and plasma. The reactive graphene can be utilized as a crosslinker for thermoplastic polymers. The reactive graphene can be utilized as a crosslinker for rubber.

The reactive graphene can be water-soluble. The solvent for reactive graphene can be aqueous. The reactive graphene can be used in a combination with aerogel SC.

The reactive graphene can be utilized as a nanofiller that reinforces a mechanical strength of materials. The reactive can be is utilized as a nanofiller that improves thermal conductivity of materials. The reactive graphene can be utilized as a nanofiller that improves electrical conductivity of materials. The reactive graphene can be constructed to act as a proton transporter.

GHC (as described in U.S. Pat. Nos. 9,281,426 and 9,460,827) is unique technology which can provide a graphene product having a lot of functional groups available a for diazo coupling reaction that other nanocarbon materials such as fullerene, diamond, pristine graphene, graphene oxide, reduced graphene oxide, and carbon nanotubes do not appear to have.

Examples exemplary embodiments of CS comprise:
4-amino 3-mercapto benzoic acid, 1,2-benzisothiazol-3 (2H)-one;
diphenyl disulfide , cysteine, cystene, biotin, glutathione, methionine, penicillin, sulfanilamide, vitamin B 1, dibenzothiophene, benzothiophene, 2,5-dimethyl thiophene, ethyl 1-propyl disulfide, thiols, tetrabutyl thiuram disulfide ,sulfides, bisulfides, dimethyl disulfide, thiolanes, thiophenol, 2-butenethiol, furfurylthiol, thiophenes, benzothiophenes, dibenzothiophenes, benzonapthothiophenes, Proxel GXL, carboxylic acid, sulfonic acids, polymers such as polysulfone resin, polystyrene sulfonic acid, polyamino acids , aromatic vinylene sulfide polymer, carbohydrate, starch, cellulose, sugar, saccharin, and/or sodium cyclamate, etc.
Examples of S elements comprised by MS can comprise metal salts such as zinc dibenzyldithiocarbamate, zinc diethyldithiocarbamate, iron diethyldithiocarbamate, natural rubber vulcanizers, and/or sulfate salts, etc.

In certain exemplary embodiments, RG can be used as a nanofiller for mechanical reinforcement.

In another exemplary of the embodiment, the XRF data of several RG products made out of components above cited is illustrated in FIG. 3000, which indicates the successful attachment of reactive sulfur S element into RG molecules with varied contents made out of different CS and MS. From this data, one can see the S value varies from approximately 19.1 weight % to 75.3% weight % proving the capability of controlling the amount of reactive functional group in the RG molecule.

FIG. 3000 is X-Ray Fluorescence spectroscopy ("XRF") data of an exemplary embodiment of RG showing the presence of reactive element sulfur.

In another exemplary of the embodiment, the above-cited RG was blended with NR latex to form (NR/RG) nano composites. The TGA data of these composites were illustrated in FIG. 4000.

FIG. 4000 is thermal gravimetric analysis ("TGA") data of an exemplary embodiment of a natural rubber/RG nano composite. The graph illustrates a baseline curve for natural rubber (shown on the graph by the line labeled "NR only". The graph illustrates curves for natural rubber/RG nanocomposites having different sulfur content with the curves labeled by the weight percent sulfur, with natural rubber having approximately 100 parts and RG having approximately 40 parts.

It was observed that the weight loss of composite was reduced with increased S content, suggesting the increased heat resistance. In another word, adding RG into an NR network substantially extended the thermal stability of NR from approximately 400° C. to approximately 600° C., which was significant. The increased heat resistance suggests the increased glass transition temperature ("Tg") of the rubber elastomer by RG; and that RG acts as an effective nanofiller for mechanical reinforcement of NR.

In another exemplary of the embodiment, similar reactive functional groups were coupled by diazo coupling reaction with graphite, GO, RGO, and other nanocarbon substances. Such coupled substances consistently showed performance improvements with different levels over the plain materials.

In another exemplary of the embodiment, a mixture of $H_2$, $N_2$, $CH_4$, $H_2S$ were purged into a quartz tube under vacuum level of approximately 10-2 torr, comprising Cu foil substrate heated to approximately 300° C. with flow rate between approximately 5-20 standard cubic centimeters per minute ("sccm") controlled by conventional mass flow controller. As a result a Reactive Pristine Graphene was achieved and showed better reactivity with NR than pure Pristine Graphene.

FIG. 5000 is TGA data of an exemplary embodiment of a natural rubber/RG nano composite. Curve 5100 illustrates data for RG/NR. Curve 5200 illustrates data for non-reactive graphene/NR. Curve 5300 illustrates data for vulcanized NR. Curve 5400 illustrates data for NR.

In another exemplary of the embodiment, nanofiller effects of aerogel SC in NR was tested and TGA data was illustrated in FIG. 6000. It is observed that RG shows the most thermal stability. On the other hand, aerogel SC demonstrated reasonable thermal stability along with reasonable enhancement of heat resistance of NR when aerogel SC was added as nano filler.

FIG. 6000 is TGA data of an exemplary embodiment of a natural rubber/aerogel SC nanocomposite. Curve 6100 illustrates data for RG. Curve 6200 illustrates data for aerogel SC. Curve 6300 illustrates data for an aerogel SC/NR composite. Curve 6400 illustrates data for vulcanized NR. Curve 6500 illustrates data for NR.

In certain exemplary of the embodiment, bulk electrical resistivity and specific surface area ("SSA") was measured to compare with other nanocarbon. The result is illustrated in FIG. 7000. It should be noted that the bulk electrical resistivity was measured by conventional 4-point probe technique. In this measurement, the powder was placed in the sample holder and strongly pressed by hydraulic force into plat pellet before being tested via an ohmmeter. RG exhibited very low bulk electrical resistivity in the range of approximately 12.4 mΩ, which is not very far from that of copper powder approximately 4-6 mΩ and thin film graphene of approximately 10-12 mΩ. On the other hand, RG shows extraordinary large SSA of approximately 1730 $m^2$/g, which is almost very closed to theoretical SSA of thin film graphene of approximately 2000 $m^2$/g. This number was superior to certain other nanocarbon substances.

FIG. 7000 is summary data of bulk electrical resistivity and specific surface area of an exemplary embodiment of RG.

Next, the FIG. 8000 illustrates the structure of supercapacitor based on the principle of electric double layer capacitor ("EDLC"). In this figure, engraved graphene layer 1000 is utilized as electrodes and RG plays the role of proton transporter. This RG can be used alone or in a combination with electrolyte polymer such as Nafion, polysulfonic acid, and/or polyvinyl alcohol ("PVA"), etc. Electrolyte 7300 comprises reactive graphene.

FIG. 8000 is a structure of electric double layer capacitor ("EDLC") utilizing an exemplary embodiment of a RG. Engraved Graphene ("EG") 8100 is comprised by porous carbon electrode 8150. Engraved graphene 8200 is comprised by porous carbon electrode 8250. Electric double layer capacitor ("EDLC") 8400 is illustrated In another exemplary of the embodiment, platinum (003) and ruthenium (004) was dissolved in strongly adsorbed on the surface of concentrated mixture of HCl and $HNO_3$ to achieve an aqueous solution of $H_2PtCl_6$ and $RuCl_3$. Engraved Graphene Hybrid Composite ("EGHC") (002) having SSA of approximately 1730 $m^2$ was soaked in the ($H_2PtCl_6$/$RuCl_3$) mixture for approximately 24 hours then dried in an oven at approximately 85° C. for approximately 3 hours. The EGHC solid carrying dried ($H_2PtCl_6$/$RuCl_3$) was refluxed in a Tetrahydrofuran ("THF") solution comprising NaBH4 for approximately 6 hours to convert ($H_2PtCl_6$/$RuCl_3$) mixture into a nanoalloy of Pt/Ru, which strongly adsorbed on the porous surface of EGHC. The EGHC/nanoalloy complex was dispersed in acetone into a black paste then paint brushed onto a conductive porous surface of Toray Carbon Paper ("TCP"). This was an anode. In order to form a cathode, the above-described process was repeated except that the Ru is not included. Next, thin film of RG was dispersed in polyvinyl alcohol ("PVA") was intercalated between two sheets of anode, cathode via a hot press. The system was incorporated into a set of copper bipolar. After being exposed the fuel cell system with $H_2$, a power potential of approximately 20 watts was achieved, which is approximately two times larger than that of GHC having an SSA of only approximately 81 $m^2$/g. The structure of the fuel cell assembly is illustrated in FIG. 9000. From this figure, one can expect that when hitting a nano Pt particle, an $H_2$ molecule is quickly ionized into an electron and an H+ cation; the electron migrated toward EGHC layer to anode giving electricity and proton H+ traveled through the (RG/PVA) layer to the cathode. The high SSA of EGHC could be an important factor to separate electron from proton avoiding geminate recombination. The TEM image of these two EGHC materials having different SSA is illustrated in FIG. 10000. It is observed that larger SSA surface showed more porosity than the narrower one. This also correlated to a higher power potential of the larger SSA.

FIG. 9000 is a structure of an exemplary hydrogen fuel cell utilizing an exemplary embodiment of an enhanced graphene hybrid composite ("EGHC") and RG. FIG. 9000 illustrates a porous electrode 9001, engraved GHC 9002, Pt nanoparticle 9003, Ru nanoparticle 9004, and reactive graphene 9005.

FIG. 10000 is a transmission electron microscope ("TEM") image of an exemplary embodiment of EGHC having a different specific surface area ("SSA").

In another exemplary of the embodiment, the RG was formulated into a thermal inkjet ink. The ink was printed on an HP Deskjet printer on plain paper. The printed matter shows a bulk electrical resistivity of approximately 200 m$\Omega$, which indicated conductivity.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
aerogel SC—a substantially solid material comprising silica/acid and of extremely low density, produced by removing the liquid component from a conventional gel comprising silica/acid.
and/or—either in conjunction with or in alternative to.
apparatus—an appliance or device for a particular purpose.
article—a particular item or object.
associate—to join, connect together, and/or relate.
average—a number expressing a central or typical value in a set of data, in particular the mean, which is calculated by dividing the sum of the values in the set by their number.
building—a structure with a roof and walls, such as a house, school, store, or factory.
can—is capable of, in at least some embodiments.
cause—to produce an effect.
cellulose—an insoluble substance that is the main constituent of plant cell walls and of vegetable fibers such as cotton.
cement—a powdery substance made with calcined lime and clay.
ceramic—a material made of clay and hardened by heat.
charge accumulative material—a substance that is able to store an electrical potential difference between a first portion of the substance and the second portion of the substance.
chemical process toner—a black or colored powder made via at least one human controlled chemical reaction and used in xerographic copying processes.
chemical stability—when a system is in substantial chemical equilibrium with its environment.
comprising—including but not limited to.
configure—to make suitable or fit for a specific use or situation.
constructed to—made to and/or designed to.
convert—to transform, adapt, and/or change.
crack—to break without a complete separation of the parts.
create—to bring into being.
crosslinker—a substance that causes creation of a chemical bond that links one polymer chain to another.
curer—to vulcanize (rubber).
define—to establish the outline, form, or structure of.
device—a machine, manufacture, and/or collection thereof.
digital printing—ink jet printing, laser printing, or thermal printing.
dissolution—a process by which two substances form a solution.
durability—an ability to withstand wear, pressure, or damage.
electron acceptor molecule—a molecule that comprises one or more of chemical substituents carrying element S, thiols, sulfides, bisulfides, thiolanes, thiophenes, benzothiophenes, dibenzothiophenes, benzonapthothiophenes, Proxel GXL, triazine, —$NO_2$, —CN, carboxylic acid, sulfonic acid, ketone —CO, hydroxyl —OH, —$SO_2$, —$SOCl_2$, isothiocyanate, aldehyde, acyl azide, anhydride, carbodiimide, epoxide, fluorophenyl ester, carbonate, alkyl, phosphate, alcohol, halide, silanol-SiOH, and siloxane.
electron donor molecule—a molecule that comprises one or more of chemical substituents carrying amino-NR1R2 where R1 and R2 comprise one or more of $H_2$, alkyl, aryl, arylene, alkylene, and phosphorous.
emulsion polymer—a type of a radical polymer (i.e., a polymer formed via the successive addition of free radical building blocks) produced via an emulsion incorporating water, monomer, and surfactant.
energy storage system—one or more components capable of acting as a repository for electrical energy.
functional group—a group of atoms responsible for the characteristic reactions of a particular compound.
generate—to create, produce, give rise to, and/or bring into existence.
gravure printing ink—a colored fluid with a very low viscosity that allows the ink to be drawn into engraved cells in a gravure cylinder then transferred onto a substrate.
ink—a substance used to print marks on a media, wherein the print marks can be made via two dimensional printing, three dimensional printing, analog printing, or digital printing, the ink can be an electrically conductive ink or a thermally conductive ink; ink can be liquid or solid.
inkjet printing ink—a colored fluid that is used in an inkjet printer that.
latex—a milky fluid from a plant that is the source of rubber.
may—is allowed and/or permitted to, in at least some embodiments.
metal—a solid material that is typically hard, shiny, malleable, fusible, and ductile, with good electrical and thermal conductivity (e.g., iron, gold, silver, copper, and aluminum, and alloys such as brass and steel).
method—a process, procedure, and/or collection of related activities for accomplishing something.
mix—to combine two or more substances.
multifunctional carboxylic acid—an acid comprising a carboxyl functional group, e.g., oxalic acid, tartaric acid, and citric acid.
multilayer device—a supercapacitor or fuel cell catalyst.
nanofiller—a doping agent distributed in the matrix of a composite, whose individual elements have at least one of their dimensions in the nanoscale.

nanoscale—a region of dimension scale between 1 and 100 nanometers, in which all major interactions in nanosystems occur and which limits geometrical dimensions of nano-objects in one or more dimensions.

offset printing ink—a colored fluid that is used in a system that transfers an image from a plate to a rubber blanket, then to a printing surface.

opaque—substantially impervious to light transmission.

particle size—a largest dimension of a solid minute portion of matter.

plurality—the state of being plural and/or more than one.

polymer—a substance that has a molecular structure consisting primarily or entirely of a large number of similar units bonded together, predetermined—established in advance.

printing—the production of books, newspapers, or other printed material.

provide—to furnish, supply, give, and/or make available.

reactive functional group—molecules comprising an electron donor molecule and an electron acceptor molecule.

reactive graphene—graphene comprising a graphene core and a shell that comprises one or more reactive functional groups.

receive—to get as a signal, take, acquire, and/or obtain.

resistance—an ability not to be affected adversely by something.

rice husk—a hard protecting coverings of grains of rice.

rubber compounding—a process that molds a tough elastic polymeric substance made from the latex of a tropical plant or synthetically.

rubber tires—a ring-shaped vehicle component comprising rubber that covers the wheel's rim to protect it and enable better vehicle performance.

rubber tree—a tree that produces the latex from which rubber is manufactured.

SC nanocomposite—a silica/acid composite.

select—to make a choice or selection from alternatives.

set—a related plurality.

silica/acid composite—a substance comprising a silica core and having a specific acidic shell. The substance having an X-ray diffraction chart with diffraction peaks appearing at approximately two theta=2°, 27.75°, 41°.

smearfast printing ink—a colored fluid that is used in a printer that does not run or easily degrade when contacted by something after application.

specific acid—an acid selected for a specific function.

solvent—a substance that is able to dissolve other substances.

substantially—to a great extent or degree.

sulfonic acid—an organic acid containing the group —SO2OH.

supercapacitor—a high-capacity electrochemical capacitor with capacitance values much higher than other capacitors (but lower voltage limits) that bridge a gap between electrolytic capacitors and rechargeable batteries. Supercapacitors utilize use electrostatic double-layer capacitance or electrochemical pseudocapacitance. Supercapacitors have a range of capacitances between approximately 0.001 F and approximately 6,000 F. Supercapacitors have cell voltages ranging between approximately 1.4 volts and approximately 125 volts.

surface modified carbon—carbon black that has been chemically modified with specific functional groups. Cab-o-jet 200 and Cab-o-jet 300 are examples of surface modified carbon black, system—a collection of mechanisms, devices, machines, articles of manufacture, processes, data, and/or instructions, the collection designed to perform one or more specific functions.

thermoplastic—a substance (especially synthetic resins) that becomes plastic on heating and hardens on cooling and can be repetitively subjected to such processes.

thermoset—synthetic plastic materials that strengthen while being heated, but cannot be successfully remolded or reheated after their initial heat-formation.

toughness—an ability of a material to absorb energy and plastically deform without fracturing.

translucent—permitting light to pass through but diffusing the light so that persons, objects, etc., on an opposite side are not clearly visible.

utilitarian substance—a material comprised by a rubber object, ink, multilayer device, semiconductor thin film precursor, proton transporter, and/or adhesive, etc.

vehicle—a system that transports people or goods such as a car, truck, or cart.

via—by way of and/or utilizing.

vulcanization—crosslinking, curing which can enhances heat resistance.

waterfast printing ink—a colored fluid that is used in a printer that does not run after it is applied to a surface and contacted with water.

wear—to damage by friction or use.

weight—a value indicative of importance.

wet dispersion—a system in which particles are dispersed in a continuous aqueous phase.

wood—a hard fibrous material that forms the main substance of the trunk or branches of a tree or shrub.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a utilitarian substance comprising reactive graphene, said reactive graphene comprising a graphene core that is chemically bonded with a reactive shell, wherein:
said graphene core is a graphene hybrid composite comprising graphene and one or more of nanocarbon, graphene nanoplatelets, graphene oxide, reduced graphene oxide and pristine graphene;
said graphene core is prepared via chemical vapor deposition utilizing at least one of a gas, liquid, and solid phase carbon sources; and
said reactive shell carries reactive functional groups that are able to chemically react with other media, wherein said other media is a superconductor, conductor, semiconductor, or insulator, said reactive functional groups comprising electron donor molecules and electron acceptor molecules, wherein:
said electron acceptor molecules comprise one or more of chemical substituents carrying element S, thiols, sulfides, bisulfides, thiolanes, thiophenes, benzothiophenes, dibenzothiophenes, benzonapthothiophenes, Proxel GXL, triazine, —$NO_2$, —CN, carboxylic acid, sulfonic acid, ketone —CO, hydroxyl —OH, ether —O—, —$SO_2$, —$SOCl_2$, isothiocyanate, aldehyde, acyl azide, anhydride, carbodiimide, epoxide, fluorophenyl ester, carbonate, alkyl, phosphate, alcohol, halide, silanol-SiOH, siloxane, and —SiX, where X comprise one or more of $H_2$, alkyl, aryl, arylene, alkylene, alkoxides; and
electron donor molecules are selected from chemical substituents carrying amino-NR1R2 where R1 and R2 comprise one or more of $H_2$, alkyl, aryl, arylene, alkylene, and phosphorous.

2. The system of claim 1, wherein:
said nano carbon comprises carbon nanotubes, graphite, fullerene, or diamond.

3. The system of claim 1, wherein:
said conductor comprises one or more of a metal, organic charge transfer complex, conducting polymer, conducting ceramics, and electrolyte.

4. The system of claim 1, wherein:
said reactive graphene induces rubber vulcanization in a rubber object.

5. The system of claim 1, wherein:
said reactive graphene is utilized as a nanofiller to reinforce a polymer.

6. The system of claim 1, wherein:
said reaction between reactive graphene and other media is chemical.

7. The system of claim 1, wherein:
said reaction between reactive graphene and other media occurs via heat, irradiation, or moisture.

8. The system of claim 1, wherein:
said reaction between reactive graphene and other media occurs via ultraviolet radiation, sun light, X-Ray, gamma ray, microwave, and plasma.

9. The system of claim 1, wherein:
said reactive graphene is water-soluble.

10. The system of claim 1, wherein:
said solvent for reactive graphene is aqueous.

11. The system of claim 1, wherein:
said reactive graphene is used in a combination with aerogel SC.

12. The system of claim 1, wherein:
said reactive graphene is utilized as a crosslinker for thermoplastic polymers.

13. The system of claim 1, wherein:
said reactive graphene is utilized as a crosslinker for rubber.

14. The system of claim 1, wherein:
said reactive graphene is utilized as a nanofiller that reinforces a mechanical strength of materials.

15. The system of claim 1, wherein:
said reactive graphene is utilized as a nanofiller that improves thermal conductivity of materials.

16. The system of claim 1, wherein:
said reactive graphene is utilized as a nanofiller that improves electrical conductivity of materials.

17. The system of claim 1, wherein:
said utilitarian substance comprises a natural rubber composite having a heat resistance of up to 550° C.

18. The system of claim 1, wherein:
said reactive graphene is constructed to act as a proton transporter.

* * * * *